United States Patent [19]

Terane et al.

[11] Patent Number: 4,954,978

[45] Date of Patent: Sep. 4, 1990

[54] PRIORITY ORDER DECOMPOSING APPARATUS

[75] Inventors: Hideyuki Terane; Shinichi Nakagawa, both of Itami, Japan

[73] Assignee: Mitsubishi Denki Kabushiki Kaisha, Tokyo, Japan

[21] Appl. No.: 198,415

[22] Filed: May 25, 1988

[30] Foreign Application Priority Data

Jan. 12, 1988 [JP] Japan .................................. 63-5294

[51] Int. Cl.$^5$ .............................................. G06F 7/38
[52] U.S. Cl. .............................. 364/715.1; 340/825.5
[58] Field of Search .................... 364/715.01, 715.04, 364/715.9–715.11, 748; 340/825.5, 825.51

[56] References Cited

U.S. PATENT DOCUMENTS

| 4,064,421 | 12/1977 | Gajski et al. | 364/715.1 |
| 4,420,695 | 12/1983 | Fisher | 340/825.5 |
| 4,773,033 | 9/1988 | Ikumi | 364/715.1 |
| 4,785,421 | 11/1988 | Takahashi et al. | 364/715.04 |

OTHER PUBLICATIONS

R. M. M. Oberman, *Digital Circuits for Binary Arithmetic*, John Wiley & Sons, New York, 1979, pp. 277–281.
"Logical Design by Means of LSI" (pp. 39–41), Shunji Okugawa (Mar. 25, 1987), Kyoritsu Shuppan Kabushiki Kaisha, publisher.

*Primary Examiner*—Dale M. Shaw

[57] ABSTRACT

A priority order decomposing apparatus converting binary data of a plurality of bits into data wherein "1"s other than "1" of the bit whose priority order is the highest are removed, a circuit for checking whether or not "1" exists is installed for each group of bits taken as a unit of converting process. When "1" exists, this is transmitted directly to the low-order-bit side to immediately set the lower-order bits to "0". This permits the operating speed to be made faster.

4 Claims, 4 Drawing Sheets

PRIORITY ORDER DECOMPOSING APPARATUS

BACKGROUND OF THE INVENTION

1. Field of the Invention

The present invention relates to a priority order decomposing apparatus removing all "1"s other than a bit whose priority order is the highest out of an input of a plurality of bits.

2. Description of the Prior Art

The priority order decomposing apparatus as described above performs processing such that, for example, in the case where an eight-bit input is (00011010), (00010000) is obtained as an output with the highest-order bit "1" left intact and the other bits set to "0". This means that this apparatus is a circuit with the highest-order bit whereto "1" is set, among an input data made effective and the other bits whereto "1"s are set rewritten into "0"s.

FIG. 1 is a circuit diagram showing a n-bit priority order decomposing apparatus. An n-bit input $X_{n-1}$, $X_{n-2}$, $X_{n-3}$, $X_{n-4}$, ... $X_1$, $X_0$ is converted into an n-bit output $Z_{n-1}$, $Z_{n-2}$, $Z_{n-3}$, $Z_{n-4}$ ... $Z_1$, $Z_0$ by n-1 inclusive-or circuits $Y_{n-2}$, $Y_{n-3}$, $Y_{n-4}$, ... $Y_1$, $Y_0$ and n-1 exclusive-or circuits $W_{n-2}$, $W_{n-3}$, $W_{n-4}$, ... $W_1$, $W_0$. Each of the input data $X_{n-2}$, $X_{n-3}$, $X_{n-4}$, ... $X_1$, $X_0$ becomes one input of each of the inclusive-or circuits $Y_{n-2}$, $Y_{n-3}$, $Y_{n-4}$, ... $Y_1$, $Y_0$, and the highest-order input data $X_{n-1}$ becomes the other input of each of the inclusive-or circuit $Y_{n-2}$ and the exclusive-or circuit $W_{n-2}$. Also, an output of each of the inclusive-or circuits $Y_{n-2}$, $Y_{n-3}$, $Y_{n-4}$, ... $Y_1Y_0$ becomes one input of each of the exclusive-or circuits $W_{n-2}$, $W_{n-3}$, $W_{n-4}$, ... $W_1$, $W_0$ respectively. An output of each of the other exclusive-or circuits $Y_{n-2}$, $Y_{n-3}$, $Y_{n-4}$, ... $Y_1$ excluding $Y_0$ becomes the other input of each of the inclusive-or circuits $Y_{n-3}$, $Y_{n-4}$, ... $Y_1$, $Y_0$ of the low-order-bit side and the other input of each of the exclusive-or circuits $W_{n-3}$, $W_{n-4}$, ... $W_1$, $W_0$, respectively. Then, respective outputs of the exclusive-or circuits $W_{n-2}$, $W_{n-3}$, $W_{n-4}$, ... $W_1$, $W_0$ are taken as the outputs of this priority order decomposing apparatus $Z_{n-2}$, $Z_{n-3}$, $Z_{n-4}$, ... $Z_1$, $Z_0$. Also, the highest-order input data $X_{n-1}$ is taken intact as the output data $Z_{n-1}$.

In accordance with such a configuration, data going through the inclusive-or circuits $Y_{n-2}$, $Y_{n-3}$, $Y_{n-4}$, ... $Y_1$, $Y_0$ become data wherein bits following the highest-order "1" are all set to "1". This means that if an input data is (00011010), it becomes (00011111). Subsequently, when the data go through the exclusive-or circuits $W_{n-2}$, $W_{n-3}$, $W_{n-4}$, ... $W_1$, $W_0$, only the output of the circuit whereto "0" and "1" are input becomes "1", and therefore the bit of the highest-order "1" is left intact and the other bits become "0". Accordingly, (00010000) is obtained as an output.

In the priority order decomposing apparatus as described above, propagations of signal by the inclusive-or circuits $Y_{n-2}$, $Y_{n-3}$, $Y_{n-4}$, ... $Y_1$, $Y_0$ produced, and therefore the apparatus has a difficulty that the operating speed is slow and the difference in the operating speeds between the high-order bit and the low-order bit becomes larger as the number of bits increases.

SUMMARY OF THE INVENTION

The present invention provides a priority order decomposing apparatus and logical circuits constituting it, wherein an improvement in the operating speed is intended by adopting a configuration such that in the case where "1" exists in a group of a plurality of bits adjacent to one another, this is transmitted directly to circuits of the group of a plurality of bits of the low-order-side.

A priority order decomposing apparatus in accordance with the present invention basically adopts a configuration wherein circuits consisting of combinations of inclusive-or circuits and exclusive-or circuits like the one of FIG. 1 are divided into groups on a plurality of bits basis, and a logical sum of input data is obtained on a group basis, and this is given to a group of the low-order-bit side as a carry output.

When "1" exists in a group of the high-order-bit side, the above-mentioned logical sum becomes "1", being transmitted immediately to a group of the low-order-bit side. Thereby the delay of operation of the low-order-bit side is reduced to a great extent.

The above and further objects and features of the invention will more fully be apparent from the following detailed description with accompanying drawings.

DESCRIPTION OF THE PREFERRED EMBODIMENTS

Hereinafter, detailed description is made on the present invention on the bases of the drawings showing an embodiment thereof.

Figure 1:
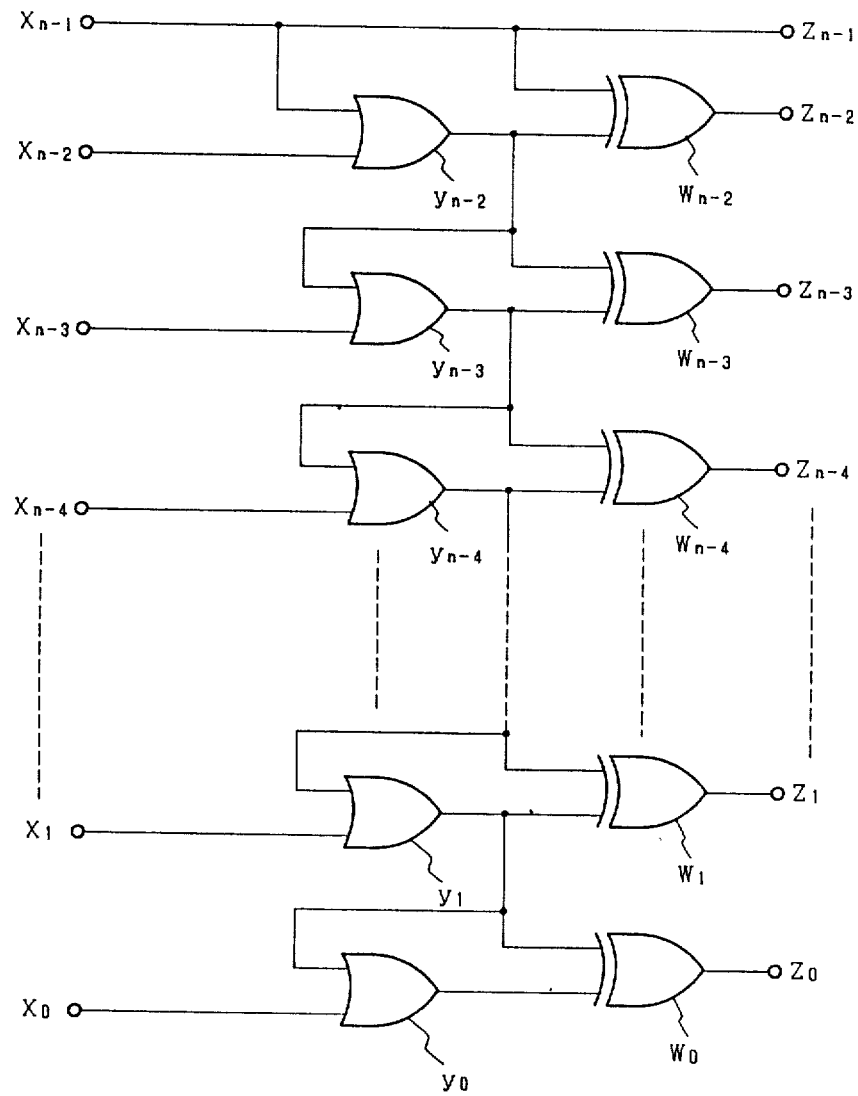
FIG. 1 is a circuit diagram of a priority order decomposing apparatus.
Figure 2:
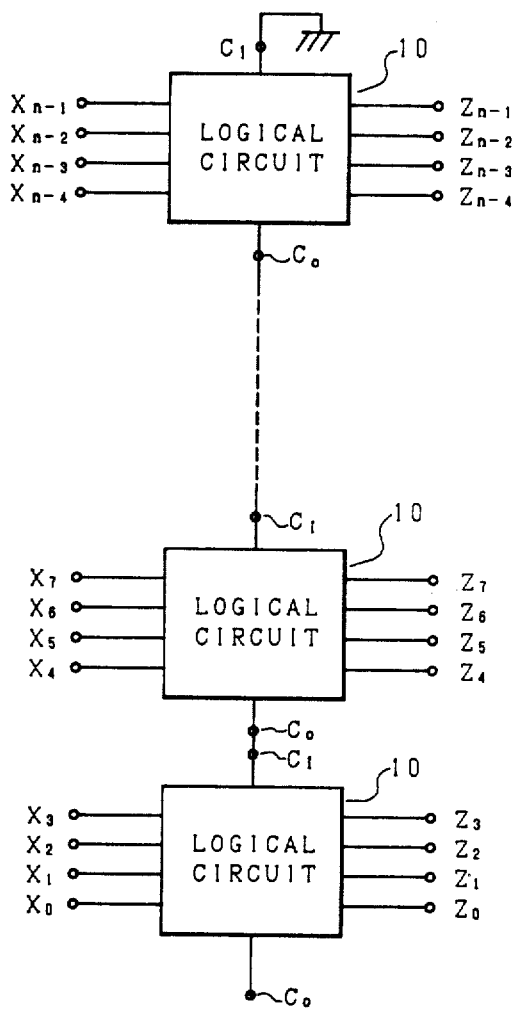
FIG. 2 is a schematic circuit diagram showing the whole configuration of a plurality order decomposing apparatus in accordance with the present invention.

FIG. 2 is a schematic circuit diagram showing a configuration of a priority order decomposing apparatus in accordance with the present invention, and in the embodiment, configuration is made using n/4 (n/4 is an integrer) logical circuits 10 each having a 4-bit input and a 4-bit output. Outputs $Z_{n-1}$, $Z_{n-2}$, ... $Z_2$, $Z_0$ are obtained from inputs $X_{n-1}$, $X_{n-2}$, ... $X_2$, $X_1$ $X_0$.

Figure 3:
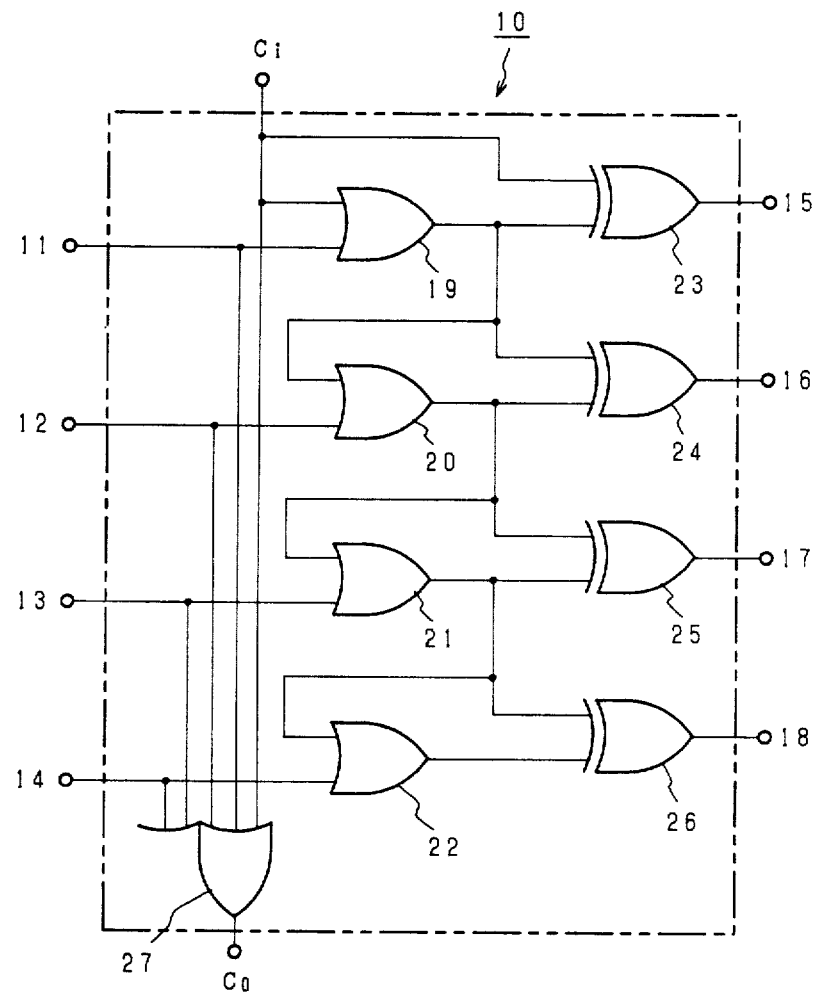
FIG. 3 is a logic diagram showing the major part of the same.

FIG. 3 shows one logical circuit 10. Numerals 11, 12, 13 and 14 designate four-bit input terminals whereto data $X_{n-1}$, $X_{n-2}$, ... $X_2$, $X_1$, $X_0$ or the like to be processed are input. Numerals 15, 16, 17 and 18 designate 4-bit output terminals wherefrom processed data $Z_{n-1}$, $Z_{n-2}$, ... $Z_2$, $Z_1$, $Z_0$ or the like output. Each of input data given to the input terminals 11, 12, 13 and 14 becomes one input of each of inclusive-or circuits 19, 20, 21 and 22 respectively, and an output of each of the inclusive-or circuits 19, 20, 21 and 22 becomes one input of each of exclusive-or circuits 23, 24, 25 and 26, respectively. Furthermore, an output of each of the inclusive-or circuits of three bits of the high-order side 19, 20 and 21 becomes the other input of each of the inclusive-or circuits of the low-order side 20, 21 and 22 and the other input of each of the exclusive-or circuits 24, 25 and 26, respectively.

In the apparatus of the present invention, a carry signal input terminal $C_i$ is installed in addition to the input terminals 11, 12, 13 and 14, and data input to this terminal $C_i$ is given as the other input of each of the inclusive-or circuit 19 and the exclusive-or circuit 23.

Furthermore, in the apparatus of the present invention, a five-input inclusive-or circuit 27 is installed, and thereto data input to the input terminals 11, 12, 13, 14 and Ci are given, and the output thereof is picked up from a carry output terminal Co.

Logical circuits 10, are connected in a cascade manner such that the carry signal output terminal Co. of the high-order-bit side is connected to carry the terminal Ci of the low-order-bit side. Then, the carry signal input terminal Ci of the high-order-bit logical circuit 10 is grounded.

Operation of the apparatus of the present invention as described above is as follows. A circuit consisting of a combination of the inclusive-or circuits 19, 20, 21 and 22 and the exclusive-or circuits 23, 24, 25 and 26 in one logical circuit 10 operates like the conventional one. This means that in the output of inclusive-or circuit, if "1" exists in the input of the high-order-side, bits following it become all "1". Accordingly, among the exclusive-or circuits of three bits of the low-order side, only one exclusive-or circuit having a "0" and a "1" on its outputs will output a "1". Then, in the case where the carry input signal is "1", the output of the inclusive-or circuit 19 is "1" and two inputs of the exclusive-or circuit 23 become "1", and therefore the output of the terminal 15 becomes "0".

In the case where the carry input signal is "0", when the highest-order bit input given to the terminal 11 is "1", the output of the inclusive-or circuit 19 is "1", and therefore the output of the exclusive-or circuit 23 becomes "1". In reverse, when that input is "0", the inputs of the exclusive-or circuit 23 are both "0", and therefore the output thereof becomes "0".

Such a carry signal is formed as an output of the inclusive-or circuit 27.

Accordingly, in the case where "1" is input to any one of the input terminals 11, 12, 13 and 14 of the logical circuit 10 of the high-order-bit side, the signal is immediately given to all of the carry input terminals Ci of the logical circuits 10, of the low-order-bit side, and the output terminals 15 thereof naturally become "0", and the other output terminals 16, 17, and 18 also become "0". Then, in the logical circuit 10 whereto "1" has been input, "1" is obtained for the output of the corresponding bit, and the other outputs become 0.

In reverse, in the case where "1" is not input to any one of the input terminals of the logical circuit 10 of the high-order-bit side, the carry signal "0" is immediately given to all of the carry input terminal Ci of the logical circuits 10, of the low-order-bit side, and in the respective circuits, the output of the bit whereto the highest-order "1" has been input becomes "1", and the other outputs become "0".

Figure 4:
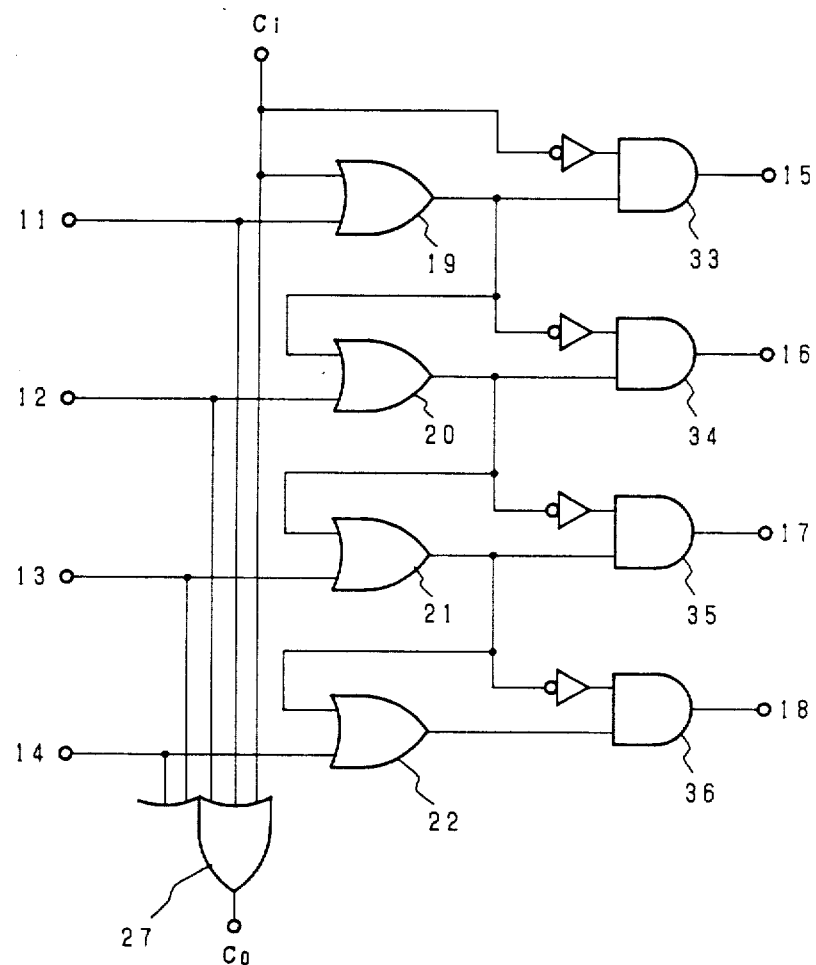
FIG. 4 is a logic diagram of a major part of another embodiment.

In addition, in the above-described embodiment, the exclusive-or circuits 23, 24, 25 and 26 are used in the output side of the logical circuit 10, but alternatively, as shown in FIG. 4, quite the same logical output is also obtainable by using one-input inversion type logical product circuits 33, 34, 35 and 36 wherein the high-order-bit side is an inversion input.

In accordance with the present invention as described above, the delay is caused only by propagations in the inclusive-or circuits 19, 20, 21 and 22 in one logical circuit or by propagation in the inclusive-or circuit 27. Accordingly, despite a priority order decomposing apparatus of a number of bits, the operation speed remarkably becomes faster in comparison with the conventional ones.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A priority order decomposing apparatus for processing input data having a plurality of logic circuits comprising:

m number of first inclusive-or circuits respectively receiving one bit of a m-bit word as a first input, m number of exclusive-or circuits respectively receiving outputs of said first inclusive-or circuits, and a second inclusive-or circuit receiving m number of said first input and a one-bit second input as inputs thereof, wherein the first inclusive-or circuit and the exclusive-or circuit of the highest-order bit receive the second input as the other input, and the other first inclusive-or circuits and exclusive-or circuits receive the output of the first inclusive-or circuit of the high-order-bit side as the other input thereof, the logic circuits being connected in a cascade manner with the output of the second inclusive-or circuit received as the second input of the logic circuit of the low-order-bit side and the first input of the logic circuit of the highest-order-bit side set to a predetermined potential, and the input data is received as the first input, and the output of said exclusive-or circuit is transmitted as a processed output.

2. A logic circuit comprising:

m number of first inclusive-or circuits respectively receiving one bit of a m-bit word as a first input, m number of exclusive-or circuits respectively receiving outputs of said first inclusive-or circuits;

a second inclusive-or circuit receiving m number of said first input and a one-bit second input as inputs thereof;

the first inclusive-or circuit and the exclusive-or circuit of the highest-order bit receive a second input as the other input; and the other first inclusive-or circuits and exclusive-or circuits take the output of the first inclusive-or circuit of the high-order-bit side as the other input thereof.

3. A priority order decomposing apparatus for processing input data having a plurality of logic circuits comprising:

m number of first inclusive-or circuits respectively receiving one bit of a m-bit word as a first input, m number of one-input inversion type logic product circuits respectively receiving outputs of said first inclusive-or circuits on respective non-inversion input terminals, and a second inclusive-or circuit receiving m number of said first input and a one-bit second input as inputs thereof, wherein the first inclusive-or circuit and the one-input inversion type logic product circuit of the highest-order bit receive the second input as the other input thereof, and the other first inclusive-or circuits and one-input inversion type logic product circuits receive the output of the first inclusive-or circuit of the high-order-bit side as the other input thereof, the logic circuits being connected in a cascade manner with the output of the second inclusive-or circuit received as the second input of the logic circuit of the low-order-bit side and the first input of the logic circuit of the highest-order-bit-side set to a predetermined potential, and the input data is received as the first input, and the output of said one-input inversion type logic product circuit is transmitted as a processed output.

4. A logic circuit comprising:

m number of first inclusive-or circuits respectively receiving one bit of a m-bit word as a first input, m number of one-input inversion type logic product circuits respectively receiving outputs of said first inclusive-or circuits on respective non-inversion input terminals thereof, and a second inclusive-or circuit receiving m number of said first input and a one-bit second input as inputs thereof, wherein the first inclusive-or circuit and the one-input inversion type logic product circuit of the highest-order bit receive the second input as the other input, and the other first inclusive-or circuits and one-input inversion type logic product circuits receive the output of the first inclusive-or circuit of the high-order-bit side as the other input therof.

* * * * *